United States Patent
Kotov (10) Patent No.: US 6,424,641 B1
(45) Date of Patent: Jul. 23, 2002

(54) SEARCHER ARCHITECTURE FOR CDMA SYSTEMS

(75) Inventor: Anatoli V. Kotov, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/136,861

(22) Filed: Aug. 19, 1998

(51) Int. Cl.[7] .............................................. H04B 7/216
(52) U.S. Cl. ..................................... 370/342; 375/150
(58) Field of Search ................................ 370/320, 335, 370/342, 441, 479; 375/130, 136, 137, 140, 141, 142, 147, 149, 150

(56) References Cited

U.S. PATENT DOCUMENTS

| | | | | |
|---|---|---|---|---|
| 5,982,763 A | * | 11/1999 | Sato | ........................ 370/342 |
| 6,069,915 A | * | 5/2000 | Hulbert | ....................... 375/150 |
| 6,175,561 B1 | * | 1/2001 | Storm et al. | ................. 370/342 |
| 6,307,840 B1 | * | 10/2001 | Wheatley, III et al. | ...... 370/252 |

\* cited by examiner

*Primary Examiner*—Kwang Bin Yao
(74) *Attorney, Agent, or Firm*—Gibbons, Del Deo, Dolan, Griffinger & Vecchione (57) ABSTRACT

Searcher architecture for use in a CDMA radio system for determining transmission delay in order to synchronize a receiver's binary code generators with those used to modulate a received, modulated signal comprises a combining means for combining samples of the received signal, buffer means for storing sequences of the combined samples, and correlators for correlating, at high clock speed, multiple sequences of the receiver's binary code generators with the stored sequences of samples in order to find correlation with a particular one of the multiple sequences of the receiver's binary code generators and thus determine the transmission delay.

23 Claims, 6 Drawing Sheets

SEARCHER ARCHITECTURE FOR CDMA SYSTEMS

FIELD OF THE INVENTION

This invention relates generally to radio communication systems such as CDMA systems, and more particularly to synchronization of a receiver with the received signal, which may have experienced transmission delays.

BACKGROUND OF THE INVENTION

CDMA (code-division multiple access) systems are well known. See, generally, *CDMA Cellular Mobile Communications and Network Security*, Dr. Man Young Rhee, Prentice Hall 1998, ISBN 0-13-598418-1, and standard TIA/EIA/IS-95, hereinafter "IS-95".

Figure 1:
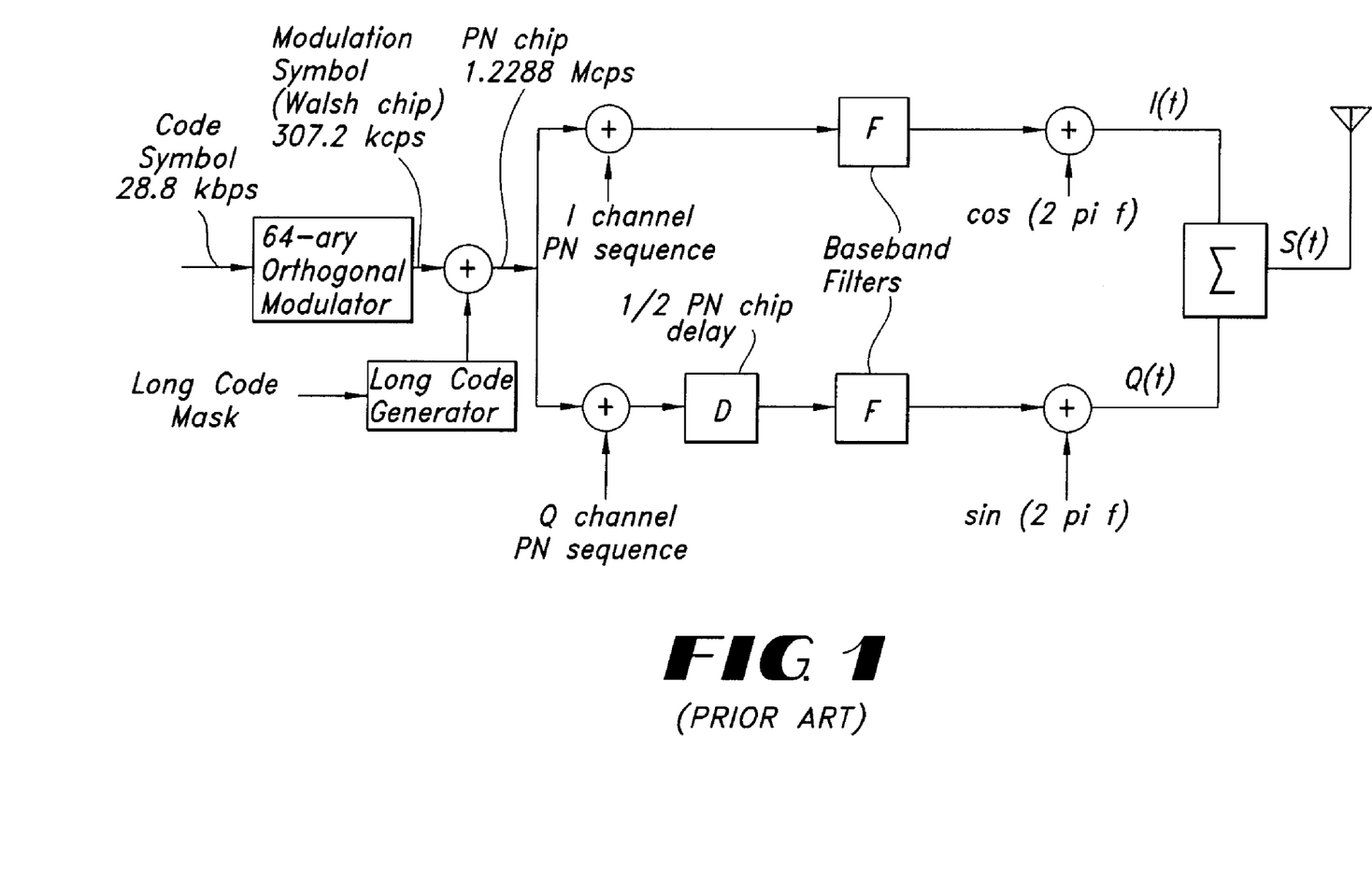
FIG. 1 (prior art) is a block diagram showing functions performed in a CDMA transmitter.

In CDMA systems, information bits transmitted from a mobile station to a base station may undergo convolutional encoding, symbol repetition, and block interleaving, the result of which is a bit stream comprising what are known as code symbols. As shown in FIG. 1 (prior art), the code symbols are then modulated into "Walsh chips". They are then "spread" into PN (pseudo-noise) chips by sequential bits of what is known in the CDMA art as the "long code" (LC). The PN chips are then OQPSK (offset quadrature phase-shift keying) modulated into two channels, known as the I channel and the Q channel, the latter being delayed by one-half a PN chip duration. Spreading to the two channels is accomplished by adding the PN chip stream in modulo-2 arithmetic to sequential bits of two different pseudo-noise binary sequences known as $PN_I$ and $PN_Q$ respectively. The PN chips are then converted from baseband to a radio transmission frequency for "air link" (radio transmission) to the base station.

When the base station demodulates the signal it converts back to baseband and undoes the aforementioned OQPSK modulation, long-code spreading, and Walsh modulation. To this end, counterparts of the mobile station's Walsh functions, long code generator, $PN_I$ generator, and $PN_Q$ generator can exist in the base station in order to produce "local replicas" of the codes used to spread and modulate the transmitted data. However, at the inception of transmission from the mobile station, the base station's generators are generally not synchronized with the received signal because of, among other things, delays occurring in transmission. Also, the mobile station may introduce delay for purposes of collision avoidance. It is thus necessary for the base station to determine the amount of transmission delay in order to effect synchronization. This is done by apparatus generally known as a "searcher". It can generally be assumed that the delay will be no greater than a particular amount, known as the "uncertainty region".

Conventional searchers generally operate on trial and error, trying varying amounts of delay with correlator circuits against the incoming received signal until meaningful results are obtained.

A "one-branch" search scheme attempts correlation against live, incoming input using only one correlator. Such a scheme is quite slow and cannot meet strict requirements for CDMA systems (as set forth in the IS-95 standard, for example).

A "multibranch" scheme using live input data (essentially, a plurality of one-branch searchers, each trying a different amount of delay) are commensurately faster than one-branch schemes, but in many cases still fall short of meeting strict standards, as those for CDMA systems.

A "total parallel" search strategy optimizes searching according to the maximum-likelihood criterion. Such schemes are much faster than "one-branch" and meet the strict requirements for CDMA systems; however, this is obtained at the expense of much greater complexity and expense.

Passive "matched filter" schemes acquire signals rapidly, since the time to cover all possible unknown positions of the uncertainty region is simply the length of the section of the PN code that is loaded as coefficients of the matched filter plus the length of the uncertainty region. However, building a matched filter of appropriate length can be quite expensive.

Accordingly there is a need for a relatively high-speed, low-cost searcher for determining transmission delay in a radio transmission system.

It is thus an object of the present invention to provide a relatively high-speed searcher for determining transmission delay.

It is another object of the present invention to provide a relatively low-complexity searcher for determining transmission delay.

It is another object of the present invention to provide a relatively inexpensive searcher for determining transmission delay.

These and other objects of the invention will become apparent to those skilled in the art from the following description thereof.

SUMMARY OF THE INVENTION

In accordance with the teachings of the present invention, these and other objects may be accomplished by the present high-speed, low-cost systems and methods of determining transmission delay. An embodiment of the present invention includes A/D converters for taking samples of the received signal after conversion to baseband, buffers for storing the samples, means for generating local replicas of the mobile station's code generators and for presenting various sequential states of the local replicas to correlators for time-compressed correlation of the local replicas with the stored samples, and determination of the transmission delay according to the relative position of a correlation value significantly greater than all the other correlation values.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DESCRIPTION OF THE INVENTION

The present invention discloses a form of "searcher" which determines a delay imparted to received signals by oversampling the signals, summing at least some of the samples of these signals, storing the sums in a buffer, and correlating the stored sums at an accelerated clock rate against local replicas generated with incrementing amounts of delay to determine a correlation identifying the amount of delay.

Figure 2:
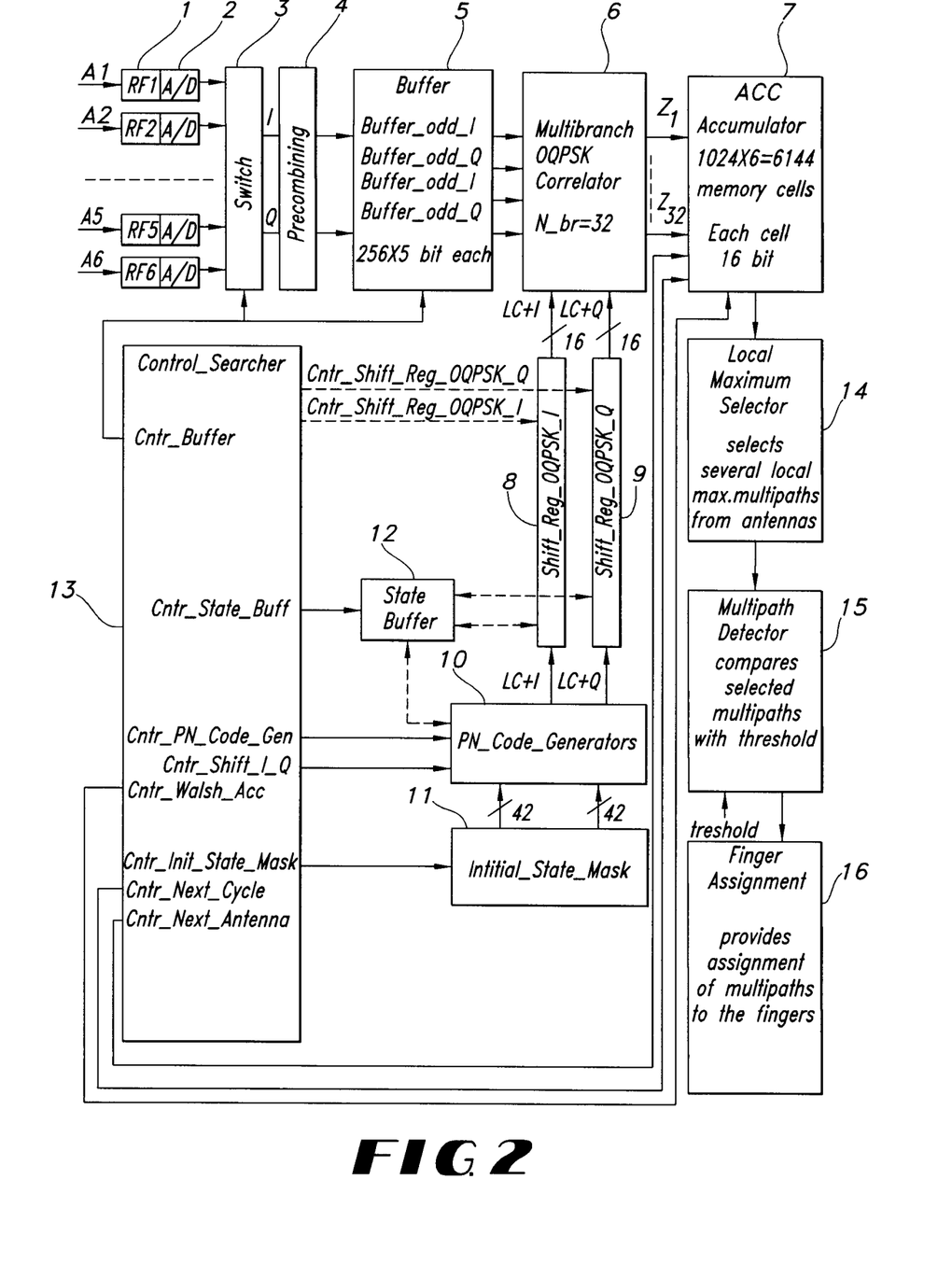
FIG. 2 is a block diagram of a searcher in accordance with the present invention.

FIG. 2 is a block diagram of the searcher architecture according to the present invention. The following parameters may apply to an embodiment of the present invention.

PN chip rate: 1.2288 Mcps

Frame duration: 20 ms.

One frame contains 96 Walsh symbols

Long Code from a 42-bit LFSR

I-channel and Q-channel PN codes from 15-bit LFSR's

Modulation: OQPSK

Access procedure: Sending of an access probe consisting of an Access Channel preamble and an Access Channel message capsule.

Access Channel preamble can be from 1 to 16 frames (20–320 ms)

Uncertainty region is less than 512 PN chips.

One Walsh symbol comprises 256 PN chips.

Those skilled in the art will recognize that these parameters may be changed depending upon the choice of components.

It is assumed by way of example that the architecture resides in a CDMA base station covering three sectors in which each sector has two diversity antennas. There are thus six antennas, designated A1 through A6. It will be apparent to those skilled in the art that more or fewer than 3 sectors may be involved and more or fewer than two antennas per sector may be employed. The delay may be determined separately for each of the diversity antennas in a sector because each may be receiving over a different path in a multipath environment.

It will also be clear to those in the art that the embodiment chosen as exemplary and about to be discussed, although practicable, is but one possible design choice among many and that other combinations of the disclosed elements may be employed without departing from the spirit of the invention.

Each antenna connects to an RF unit 1, which converts the received signal to baseband. Analog-to-digital (A/D) converters 2 take 4-bit samples of the signals, at a rate of 8 times the PN chip rate (oversampling). In alternative embodiments, greater or lesser sampling rates could be employed.

Switch 3 processes samples from one antenna at a time. For the current antenna, precombining element 4, under control of Control_Searcher 13, stores four sequences of combinations of the four-bit samples into buffers 5. In the present embodiment, the range of samples used corresponds to the duration of one Walsh symbol (256 PN chips). It is assumed that the samples are numbered 1, 2, 3, 4, 5, . . . . For a sequence of samples in each of the I and Q sample streams:

Buffer_odd_I stores the sums of samples 3 and 7, 11 and 15, 19 and 23, . . . , 2043 and 2047 from the stream of I samples;

Buffer_odd_Q stores corresponding sums from the stream of Q samples;

Buffer_even_I stores the sums of samples 7 and 11, 15 and 19, 23 and 27, . . . , 2047 and 2051 from the stream of I samples;

Buffer_even_Q stores corresponding sums from the Q stream of samples.

The present embodiment contemplates oversampling for possible use of other portions of the receiver not discussed in conjunction with the present invention. For example, some portions of the receiver may rely on oversampling in order to adjust delay by increments considerably finer than one PN chip duration. The present embodiment uses only two samples per PN chip duration.

There are thus 256 stored sums in each buffer, each five bits in size since they are each the sums of two four-bit samples. Samples used in filling even buffers are inherently delayed one-half of a PN chip from samples used in filling odd buffers by virtue of being derived from samples taken half a chip time later. These special combinations of samples, working in conjunction with the interconnectivity of the buffers with the correlators, impart the ability to double the speed of signal processing with no loss in signal-to-noise ratio.

Correlators 6 correlate the "piece" of the received signal stored in buffers 5 against all the possible states, over the uncertainty region, of the PN code generators 10. In the mobile station the Long Code is typically produced by a 42-bit LFSR of known configuration, and the $PN_I$ and $PN_Q$ codes by-15-bit LFSR's of known configurations. By means well known to those in the art, LFSR's of the same configurations may be included in the base station receiver, as may Initial_State_Mask 11, and thus the Long Code and PN codes may be generated in the base station. Also by means well known to those in the art, the inputs LC+I and LC+Q to shift registers 8 and 9 are produced by adding successive bits of $PN_I$ and $PN_Q$ respectively to successive bits of LC in modulo-2 arithmetic. The bit sequences thus produced, being "local replicas" of the codes employed in the mobile station, are shifted serially into shift registers 8 and 9, as shown in FIG. 2.

Figure 3:
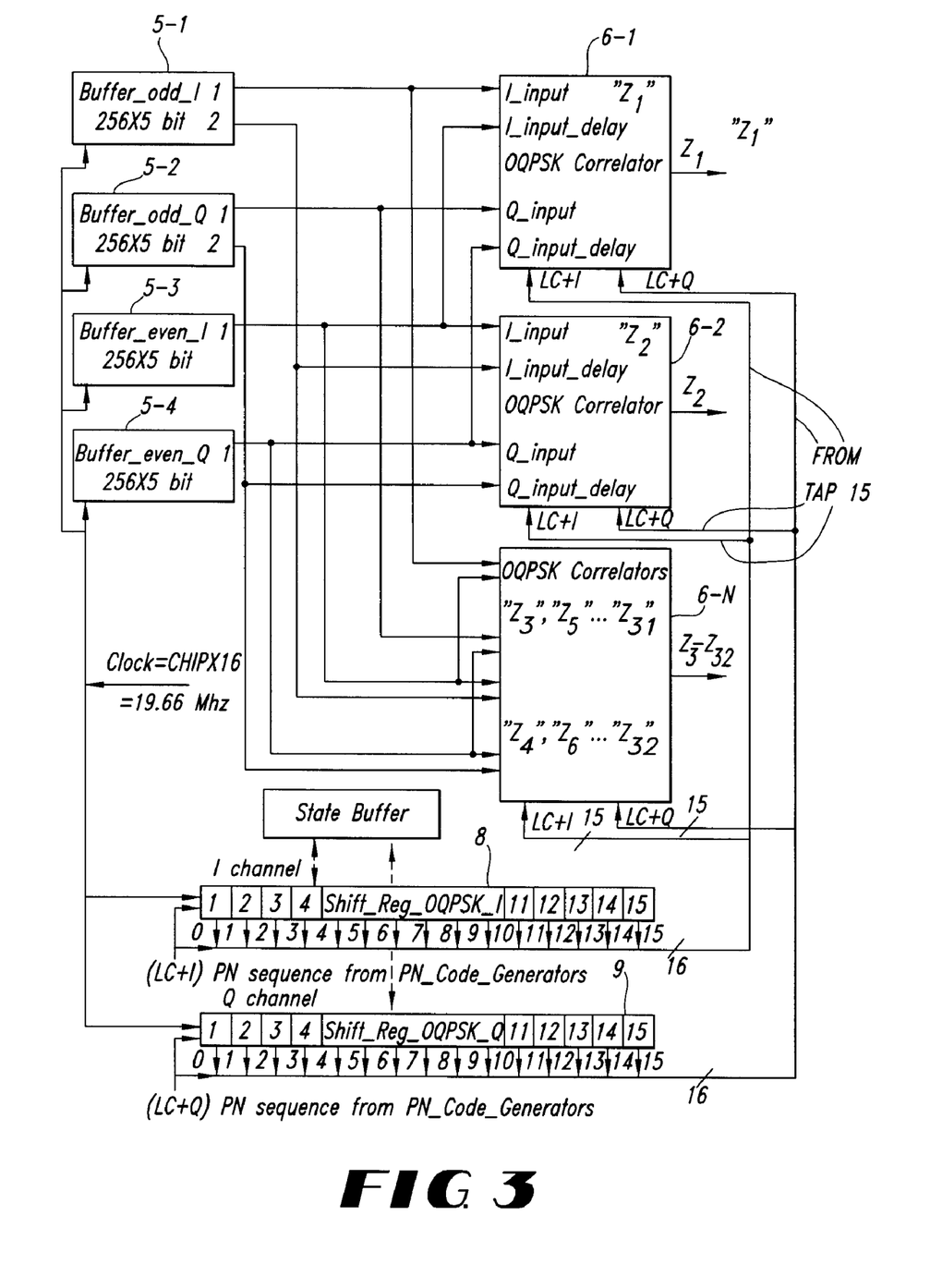
FIG. 3 is a block diagram illustrating operation of the multibranch OQPSK correlators depicted in FIG. 2.

FIG. 3 shows further detail of the present invention. In particular the correlators 6, first shown in FIG. 2, are now shown in FIG. 3 as elements 6-1 and 6-2, connoting correlators Z1 and Z2, along with a generalized correlator element 6-N schematically representing correlators Z3, Z4, Z5, . . . Z32. The present embodiment employs 32 correlators, although in alternative embodiments that number may be adjusted upward to improve performance or downward to enhance economy.

The number of correlators is double (32) the number of taps available from either of shift registers 8 or 9 (16 taps). Each pair of correlators (i.e., Z1 and Z2; Z3 and Z4; . . . Z31 and Z32) uses the same "local replicas" from shift registers 8 and 9. Special connections of the pairs of correlators 6 with buffers 5 provide calculation of correlation integrals in such a way that correlation values from each pair of correlators Z1 and Z2; Z3 and Z4; . . . Z31 and Z32 are one-half PN chip apart.

Any clock rate may be used provided it does not exceed the capabilities of the circuitry employed. The present embodiment uses a clock rate of 19.66 MHz., which is 16 times the PN chip rate and which is within the capabilities of modern circuitry.

Also, further detail is shown of buffers 5, shown in FIG. 3 as buffers 5-1 through 5-4. Each of these has outputs 1 and 2, although output 2 is used only on buffers 5-1 and 5-2. Output 2 is delayed one PN chip time from output 1.

Each of the correlators 6 has four inputs from the buffers, labeled I, $I_{delay}$, Q, and $Q_{delay}$. FIG. 3 shows detail of the interconnectivity of the buffers 5 and the correlators 6. Each of correlators 6 also has an input from a particular tap on each of shift registers 8 and 9; it is seen that two correlators connect to corresponding taps; e.g., correlators Z1 and Z2 connect to tap 15 on the respective shift registers, correlators Z3 and Z4 (implicit in generalized element 6-N) to tap 14, etc. Because of the aforementioned delays, the correlators within a pair work with stored samples one-half a PN chip duration apart. Said delays are summarized in Table 1.

TABLE 1

|  | INPUT | DELAY (PN chips) |
|---|---|---|
| Correlator Z1: | I-input | 0 |
| (Exemplary for | I_input_delay | 1/2 |
| odd-numbered | Q_input | 0 |
| correlators) | Q_input_delay | 1/2 |
| Correlator Z2: | I_input | 1/2 |
| (Exemplary for | I_input_delay | 1 |
| even-numbered | Q_input | 1/2 |
| correlators) | Q_input_delay | 1 |

It is seen from Table 1 that Z2 (and all the even-numbered correlators) have all inputs delayed one-half PN chip relative to the inputs to Z1. Thus the two correlation values produced by each pair of correlators are one-half PN chip duration apart. It is also seen that the aforementioned precombining of samples one-half PN chip duration apart facilitates obtaining correlation values with 1/2 PN chip resolution.

The "piece" of received signal stored in buffers 5 is to be correlated against segments of the local replicas over the uncertainty region to determine which one yields a significantly greater correlation value and thus to determine the delay. Each segment is 256 bits in length (to match the number of sample sums in each buffer), which in turn was chosen so as to cover one Walsh symbol period. The total number of segments used, for each of $PN_I$ and $PN_Q$ sequences, will be 512, equal to the size of the uncertainty region. The first segment used will start from the first bit position of the local replicas, and each of the 511 succeeding segments will start with the 511 next succeeding bit positions. Since the correlators work in pairs, each member of a pair working with data samples one-half a PN chip duration apart, the use of 512 segments results in 1024 correlation values, enabling the determination of the delay within half a PN chip duration.

Figure 4:
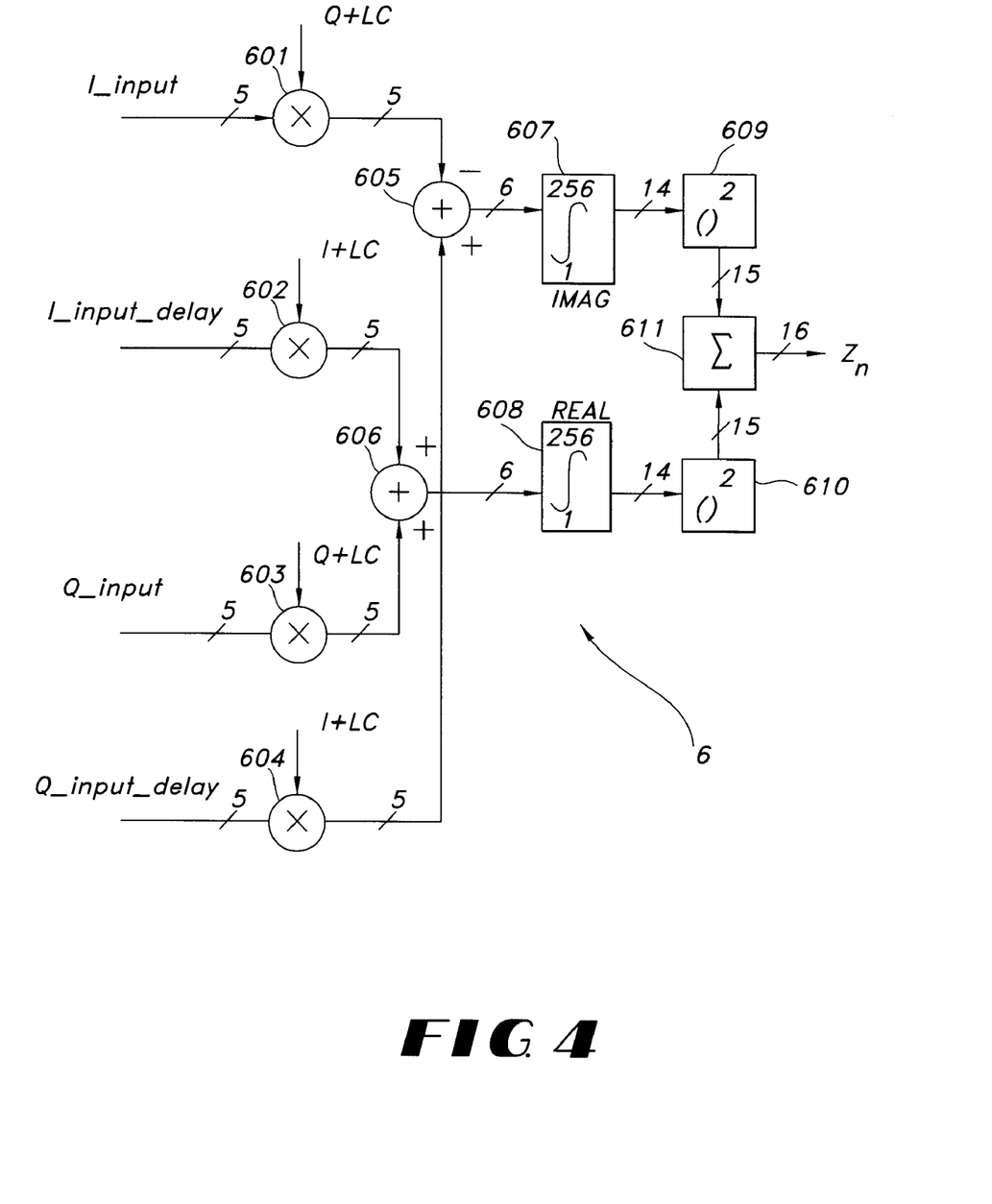
FIG. 4 depicts the logic functions performed by the correlators of FIG. 3.

FIG. 4 shows the logic functions performed within each of correlators 6. The two I and the two Q inputs from buffers 5 each consist of five-bit samples, and each five-bit sample is multiplied, by multipliers 601–604, by respective ones of the outputs of the taps from shift registers 8 and 9. These multipliers, as well as other components of correlator 6, are depicted schematically to indicate functionality. Detail of handling multiple bits is left as a design choice.

Pairs of the resultant five-bit products thus obtained are added as shown by adders 605 and 606 to produce six-bit sums. 256 such sums are integrated by each of integrators 607 and 608 as 256 bits of the local replica are clocked through shift registers 8 and 9. The integral of 256 six-bit sums can be 14 bits in length. The integrals are then squared by elements 609 and 610 respectively; the squares are truncated to 15 bits in length, which is sufficiently precise for the present application. The two results from elements 609 and 610 are summed by element 611 to produce the 16-bit Z output for the particular correlator, which is one of 32 correlators producing Z1 through Z32.

Referring again to FIG. 2, the correlator outputs are stored in Accumulator (ACC) 7, seen to have 6144 sixteen-bit cells, equal to 1024 sixteen-bit cells for each of the six antennas of the present embodiment. It has thus far been shown how the first 32 cells for the current antenna were determined and loaded. It will now be shown how a similar process is performed an additional 31 times to complete the 1024 cells for one antenna. The setup of LC+I and LC+Q local replica data for each of the 32 "passes" is referred to as a "segment".

Initially, the shift registers 8 and 9 (referring to FIG. 3) are loaded with the first 15 bits of the sequences from each of the PN code generators 10. Denoting the bits of the LC+I and LC+Q PN sequences as bits 1, 2, 3, etc., it is seen in FIG. 3 that correlators Z1 and Z2 are now presented with bit 1 (of the two sequences respectively, from tap 15 of shift registers 8 and 9 respectively), correlators Z3 and Z4 with bit 2, and so on up through correlators Z31 and Z32 being presented with bit 16. Shift registers 8 and 9 are then shifted (and the PN code generators are advanced) 256 times. Referring to Table 2 at the "First Pass" entry, it is seen that correlators Z1 and Z2 now correlate bits 1–256 against the 256 sums stored in each of buffers 5, correlators Z3 and Z4 correlate bits 2–257, and so on, up through correlators Z31 and Z32 correlating bits 16–271. This completes the first pass and results in storing the first 32 correlator values (for the current antenna) in ACC 7.

TABLE 2

|  | Bits presented to CORR's Z1, Z2 | Bits presented to CORR's Z3, Z4 | . . . | Bits presented to CORR's Z31, Z32 | Leading bit involved in save |
|---|---|---|---|---|---|
| First Pass (256 shifts with save after 16) | 1-256 | 2-257 | . . . | 16-271 | 17 |
| (Restore) Second Pass | 17-272 | 18-273 | . . . | 32-287 | 33 |
| (Restore) Third Pass | 33-288 | 34-289 | . . . | 48-303 | 49 |
| . | . | . |  | . | . |
| . | . | . |  | . | . |
| . | . | . |  | . | . |
| (Restore) Thirty-first Pass | . | . |  | . | 497 |
| . | . | . |  | . |  |
| (Restore) Thirty-second Pass | 497-752 | 498-743 | . . . | 512-767 | xxx |

After 16 shifts of each pass, state buffer 12 stores the states of shift registers 8 and 9 and the PN code generators. In the First Pass, the PN sequences are thus saved beginning with bit 17 of each, as shown in Table 2. (In the present embodiment, state buffer 12 consists of 102 bits—42 for the LC generator, 15 for each of the PN generators, and 15 for each of shift registers 8 and 9).

Prior to each successive pass, shift registers 8 and 9 and the PN and LC code generators are restored from state buffer 12. After the restore preparatory to the Second Pass, bit 17 of the respective PN sequences is the leading bit in shift registers 8 and 9 respectively. As shown in Table 2, the 256 shifts comprising the Second Pass present bits 17–272 to correlators Z1 and Z2, and so on up through presenting bits 32–287 to correlators Z31 and Z32. Saving in state buffer 12 after 16 shifts of the Second Pass stores bits from 33 on, which are restored preparatory to the Third Pass.

The net effect of the 32 passes is to present 32 bit sequences to each of the 32 correlators for a total of 1024 bit sequences (512 $PN_I$ and 512 $PN_Q$ sequences) presented to correlators, where each sequence consists of 256 consecutive bits, the first sequence begins with bit 1, the second with bit 2, and so on up through the 512th sequence beginning with the 512th bit. 1024 correlation values are thus stored in ACC 7, the correlation values representing time steps of one-half a PN chip duration. The correlation values thus span 512 PN chip durations. The uncertainly region having been taken to be 512 PN chips, the entire uncertainty region is represented.

Figure 5:
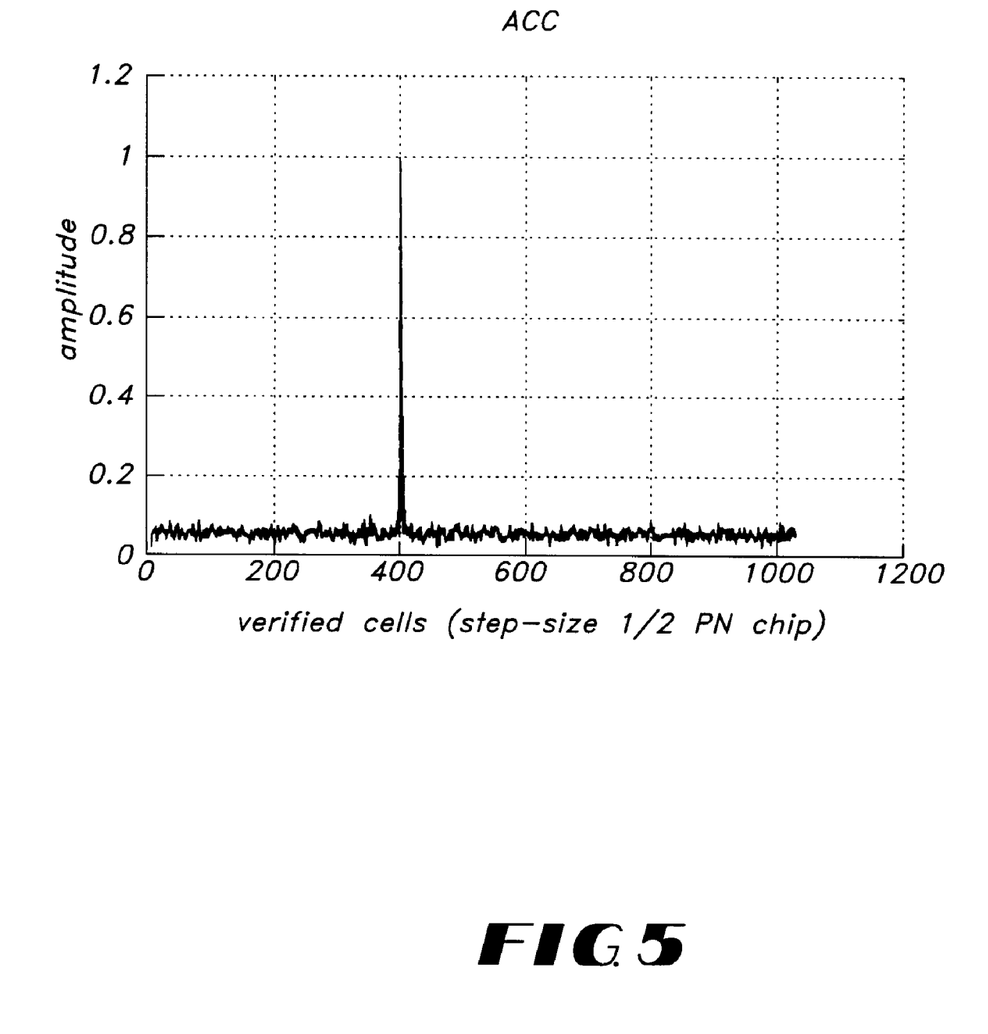
FIG. 5 is a graphical representation of exemplary outputs of the correlators of the present invention.

The correlator values may be examined as is well known in the art. FIG. 5 shows a graph of 1024 ACC contents for one antenna with a significant peak at the 400th entry; since the step-size in the present embodiment is one-half PN chip, it can thus be determined that the transmission delay is 200 PN chip times for this example.

Figure 6:
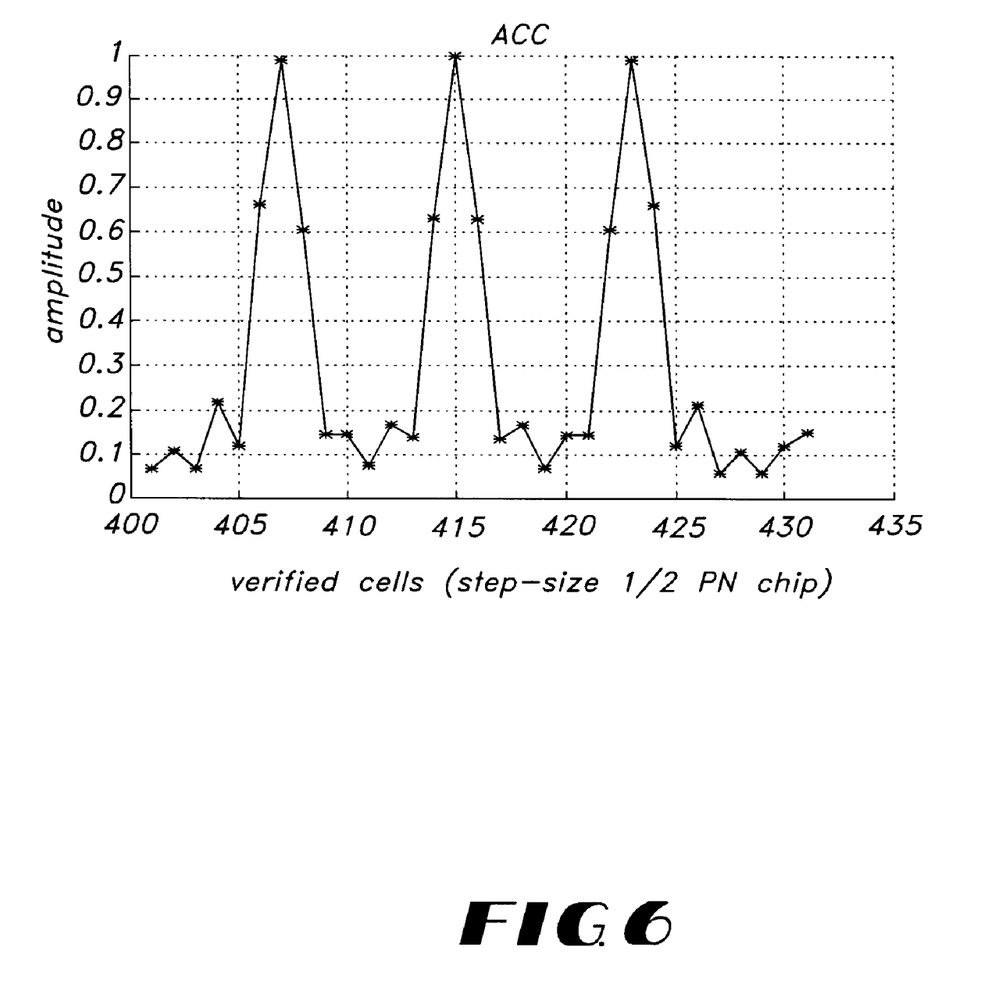
FIG. 6 is a graphical representation of exemplary outputs of the correlators of the present invention which might occur during multipath reception.

FIG. 6 is a graph of a selected range of correlator values (positions 400 through 435) connoting delays corresponding to three received copies of the signal in a multipath environment. The relative increments of delay can be determined and, as is known in the art, can be used to configure the "fingers" in a "rake receiver" to optimize the quality of multipath reception.

The described embodiment, with its 32 correlators, 32 passes, and clock rate of 16 times the PN chip rate, is but one possible design choice for these parameters. It will be clear to those skilled in the art that an embodiment can be constructed having, for example, one-fourth the number of correlators but operating at a clock rate four times higher and with four times the number of passes, and that such an embodiment would exhibit the same overall performance as the discussed embodiment. The number of correlators could be increased to enhance performance or decreased to improve economy. Numerous other variations can be contemplated.

It will thus be seen that the invention efficiently attains the objects set forth above, among those made apparent from the preceding description. In particular, the invention provides a searcher for rapidly determining transmission delay. High speed may be achieved by using a clock rate many times higher than the PN chip rate of radio transmission, or by employing an arbitrarily large number of correlators and shift register stages. It is also seen that the searcher is relatively simple and inexpensive. Those skilled in the art will appreciate that the configurations depicted in FIGS. 1, 2, 3, and 4 attain these objectives.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. In a CDMA system, a method of determining in a base station a time delay of the system according to a transmission received from a mobile station, which transmission is spread by a long code and modulated according to first and second PN codes, comprising:

downconverting the transmission to a baseband signal;

sampling a portion of the baseband signal at a rate greater than a PN chip rate of the signal to produce sample values;

storing the sample values;

generating a first sequence of sums of successive bits of the long code and successive bits of the first PN code;

generating a second sequence of sums of successive bits of the long code and successive bits of the second PN code;

producing a series of N pairs of correlation values where N is a positive integer greater than 0, each pair of correlation values being produced by correlating a number of successive stored samples beginning with a first stored sample with the same number of successive bits from the first and second sequences, respectively;

a first pair of correlation values being produced with successive bits from the first and second sequences beginning with a first bit of each, each successive pair of correlation values being produced with successive bits from the first and second sequences beginning with a next sequential bit of each;

determining a greatest one of the correlation values; and determining the time delay according to position within the series of correlation values of the greatest one of the correlation values.

2. The method of claim 1 wherein in the sampling step the rate is at least double the PN chip rate of the signal.

3. The method of claim 1 wherein N is at least equal to a number of PN chip durations comprising the time delay of the system.

4. The method of claim 1 wherein the step of producing a series of pairs of correlation values employs said successive bits of said sequences at a rate substantially higher than the PN chip rate of the signal.

5. In a radio communication system comprising at least one transmitter and at least one receiver, in which in the transmitter digital data to be transmitted are spread with a binary long code (LC) sequence of predetermined starting value which repeats every $2^J-1$ bits, and modulated into 2 channels of pseudonoise (PN) chips of fixed, predetermined PN chip duration and fixed, predetermined PN chip rate, a first PN channel being associated with a first binary PN sequence of predetermined starting value which repeats every $2^K-1$ bits, and a second PN channel being associated with a second binary PN sequence of predetermined starting value which repeats every $2^K-1$ bits, and in which transmission from transmitter to receiver occurs with a transmission delay, where J and K are positive integers greater than zero and J is equal to or greater than K, a method for determining the transmission delay in terms of a number of PN chip durations, comprising:

saving a number M samples of received signal in a buffer, where M is a positive integer greater than 0 and the samples are taken at least at the PN chip rate;

generating the long code sequence;

generating the PN sequences;

correlating at a speed substantially higher than the PN chip rate the samples saved in the buffer with a number N sequences of a combination of the long code and the first PN sequence, and with N sequences of a combination of the long code and the second sequence to produce 2N correlation values, where N is a positive integer greater than 0, wherein each of the N sequences are M bits in length, and where a first of each of the sequences begins at a first bit position of the combination of the long code and the PN sequence, and each succeeding one of the N sequences begins with a succeeding position of the combination of the long code and the PN sequence;

determining a greatest of the correlation values; and
determining the delay according to a position of the greatest of the correlation values within the correlation values.

6. The method of claim 5 wherein the radio communication system is a CDMA system, J is equal to 42, and K is equal to 15.

7. The method of claim 5 wherein N is at least equal to a number of PN chip durations comprising a maximum transmission delay.

8. In a radio communication system comprising at least one transmitter and at least one receiver, in which in the transmitter digital data are spread with a binary long code (LC) sequence of predetermined starting value which repeats every $2^J-1$ bits, and modulated into 2 channels of pseudonoise (PN) chips of fixed, predetermined PN chip duration and fixed, predetermined PN chip rate, a first PN channel being associated with a first binary PN sequence of predetermined starting value which repeats every $2^K-1$ bits, and a second PN channel being associated with a second binary PN sequence of predetermined starting value which repeats every $2^K-1$ bits, and in which transmission from transmitter to receiver occurs with a transmission delay, where J and K are positive integers greater than zero and J is equal to or greater than K, a method for determining the transmission delay in terms of a number of PN chip durations, comprising:
downconverting the first and second PN channels to baseband;
determining digital samples of the first and second PN channels at a rate at least double the PN chip rate;
saving in a first buffer a sequence of at least M sums of pairs of samples of the first PN channel, which pairs comprise samples taken one-half a PN chip duration apart;
saving in a second buffer a sequence of at least M sums of pairs of samples of the second PN channel, which pairs comprise samples taken one-half a PN chip duration apart;
saving in a third buffer a sequence of at least M sums of pairs of samples of the first PN channel, which pairs comprise samples taken one-half a PN chip duration apart, a first sample of which occurs one-half a chip duration later than a first sample of a sum in the first buffer;
saving in a fourth buffer a sequence of at least M sums of pairs of samples of the second PN channel, which pairs comprise samples taken one-half a PN chip duration apart, a first sample of which occurs one-half a chip duration later than a first sample of a sum in the second buffer;
generating a first sequential binary code which is a modulo-2 sequential sum of the long code and the first binary PN sequence;
generating a second sequential binary code which is a modulo-2 sequential sum of the long code and the second binary PN sequence;
correlating at a speed substantially higher than the PN chip rate the sums saved in the buffers with segments of each of the first and second sequential codes to produce correlation values;
determining a maximum correlation value being a greatest value among the correlation values; and
determining the transmission delay as a number of PN chip durations equal to one-half a position of the maximum correlation value within the correlation values.

9. The method of claim 8 wherein the step of correlating comprises:
denoting first positions within the first and second sequential binary codes as reference positions;
producing a first correlation value by:
sequentially multiplying each bit of a value from the first buffer by the reference position of the second sequential binary code to produce first products;
sequentially multiplying each bit of a value from the third buffer by the reference position of the first sequential binary code to produce second products;
sequentially multiplying each bit of a value from the second buffer by the reference position of the second sequential binary code to produce third products;
sequentially multiplying each bit of a value from the fourth buffer by the reference position of the first sequential binary code to produce fourth products;
sequentially adding an inverse of bits of the first products to bits of the fourth products to produce first sums;
sequentially adding bits of the second products to bits of the third products to produce second sums;
adding in parallel bits comprising the first sums to a first integral;
adding in parallel bits comprising the second sums to a second integral;
repetitively advancing to next locations of the buffers and advancing the reference positions to next positions of the sequential binary codes and repeating the steps from the first sequentially multiplying step through second adding step until M sums have been added to each of the first and second integrals;
squaring the first integral to produce a first square;
squaring the second integral to produce a second square; and
summing the first and second squares to produce the first correlation value,
producing a second correlation value by:
sequentially multiplying each bit of a value from the third buffer by the reference position of the second sequential binary code to produce fifth products;
sequentially multiplying each bit of a value from the first buffer, delayed by one PN chip duration, by the reference position of the first sequential binary code to produce sixth products;
sequentially multiplying each bit of a value from the fourth buffer by the reference position of the second sequential binary code to produce seventh products;
sequentially multiplying each bit of a value from the second buffer, delayed by one PN chip duration, buffer by the reference position of the first sequential binary code to produce eighth products;
sequentially adding an inverse of bits of the fifth products to bits of the eighth products to produce third sums;
sequentially adding bits of the sixth products to bits of the seventh products to produce fourth sums;
adding in parallel bits comprising the third sums to a third integral;
adding in parallel bits comprising the fourth sums to a fourth integral;
repetitively advancing to next locations of the buffers and advancing the reference position to next positions of the sequential binary codes and repeating the steps from the first sequentially multiplying step through the second adding step until M sums have been added to each the third and fourth integrals;

squaring the third integral to produce a third square;
squaring the fourth integral to produce a fourth square; and
summing the third and fourth squares to produce the second correlation value, and
restoring the reference position to one greater than its previous intial value and repeating the steps of determining a first correlation value and a second correlation value for a total of N performances of those steps,
whereby 2N correlation values are determined.

10. The method of claim 8 wherein the radio communication system is a CDMA system, J is equal to 42, and K is equal to 15.

11. The method of claim 9 wherein N is at least equal to a number of PN chip durations comprising the time delay of the system.

12. In a radio communication system comprising at least one transmitter and at least one receiver, in which in the transmitter digital data are spread with a binary long code (LC) sequence of predetermined starting value which repeats every $2^J-1$ bits, and modulated into 2 channels of pseudonoise (PN) chips of fixed, predetermined PN chip duration and fixed, predetermined PN chip rate, a first PN channel being associated with a first binary PN sequence of predetermined starting value which repeats every $2^K-1$ bits, and a second PN channel being associated with a second binary PN sequence of predetermined starting value which repeats every $2^K-1$ bits, and in which transmission from transmitter to receiver occurs with a transmission delay, where J and K are positive integers greater than zero and J is equal to or greater than K, apparatus for determining the transmission delay in terms of a number of PN chip durations, comprising:

buffers for saving a number M sample values, where M is a positive integer greater than 0;

precombining means for computing M combinations of samples of received signal and saving them in the buffer;

first generating means for generating the long code sequence;

second generating means for generating the PN sequences;

correlating means for correlating at a speed substantially higher than the PN chip rate the combinations saved in the buffer with N sequences of combination of the long code and the first PN sequence, and with N sequences of combination of the long code and the second sequence to produce 2N correlation values,
wherein the N sequences are each M bits in length, and wherein a first of each the N sequences begins at a first bit position of the combination of the long code and the PN sequence, and each succeeding one of the N sequences begins with a succeeding position of the combination of the long code and PN sequence;

accumulator means for storing the correlation values;

means for determining a greatest of the correlation values; and means for determining the delay according to a position of the greatest of the correlation values within the correlation values.

13. The apparatus of claim 12 wherein the radio communication system is a CDMA system, J is equal to 42, and K is equal to 15.

14. The apparatus of claim 12 wherein N is equal to at least a number of PN chip durations comprising the transmission delay.

15. In a radio communication system comprising at least one transmitter and at least one receiver, in which in the transmitter digital data are spread with a binary long code (LC) sequence of predetermined starting value which repeats every $2^J-1$ bits, and modulated into 2 channels of pseudonoise (PN) chips of fixed, predetermined PN chip duration and fixed, predetermined PN chip rate, a first PN channel being associated with a first binary PN sequence of predetermined starting value which repeats every $2^K-1$ bits, and a second PN channel being associated with a second binary PN sequence of predetermined starting value which repeats every $2^K-1$ bits, and in which transmission from transmitter to receiver occurs with a transmission delay, where J and K are positive integers greater than zero and J is equal to or greater than K, apparatus for determining the transmission delay in terms of a number of PN chip durations, comprising:

means for downconverting the first and second PN channels to baseband;

means for determining digital samples of the first and second PN channels at a rate at least double the PN chip rate;

buffers for storing at least M sample values each, where M is a positive integer greater than 0;

precombining means for saving in a first buffer a sequence of at least M sums of pairs of samples of the first PN channel, which pairs comprise samples taken one-half a PN chip duration apart;

precombining means for saving in a second buffer a sequence of at least M sums of pairs of samples of the second PN channel, which pairs comprise samples taken one-half a PN chip duration apart;

precombining means for saving in a third buffer a sequence of at least M sums of pairs of samples of the first PN channel, which pairs comprise samples taken one-half a PN chip duration apart, a first sample of which occurs one-half a chip duration later than a first sample of a sum in the first buffer;

precombining means for saving in a fourth buffer a sequence of at least M sums of pairs of samples of a second PN channel, which pairs comprise samples taken one-half a PN chip duration apart, a first sample of which occurs one-half a chip duration later than a first sample of a sum in the second buffer;

first generating means for generating a first sequential binary code which is a modulo-2 sequential sum of the long code and the first binary PN sequence;

second generating means for generating a second sequential binary code which is a modulo-2 sequential sum of the long code and the second binary PN sequence;

correlating means for correlating bit positions of each of the first and second sequential binary codes with the values in the first, second, third, and fourth buffers to determine correlation values;

means for storing the correlation values;

means for determining a maximum correlation value being a greatest value among the correlation values; and means for determining the transmission delay as a number of PN chip durations equal to one-half the position within the correlation values of the maximum correlation value.

16. The apparatus of claim 15 wherein the correlating means comprises:

means for denoting first positions within the first and second sequential binary codes as reference positions;

means for producing a first correlation value, comprising:
  means for sequentially multiplying each bit of a value from the first buffer by the reference position of the second sequential binary code to produce first products;
  means for sequentially multiplying each bit of a value from the third buffer by the reference position of the first sequential binary code to produce second products;
  means for sequentially multiplying each bit of a value from the second buffer by the reference position of the second sequential binary code to produce third products;
  means for sequentially multiplying each bit of a value from the fourth buffer by the reference position of the first sequential binary code to produce fourth products;
  means for sequentially adding an inverse of bits of the first products to bits of the fourth products to produce first sums;
  means for sequentially adding bits of the second products to bits of the third products to produce second sums;
  means for adding in parallel bits comprising the first sums to a first integral;
  means for adding in parallel bits comprising the second sums to a second integral;
  means for repetitively advancing to next locations of the buffers and advancing the reference positions to next positions of the sequential binary codes and repeatedly employing the means from the first sequentially multiplying means through second adding means until N sums have been added to each of the first and second integrals;
  means for squaring the first integral to produce a first square;
  means squaring the second integral to produce a second square; and
  means for summing the first and second squares to produce the first correlation value,
means for producing a second correlation value, comprising:
  means for sequentially multiplying each bit of a value from the third buffer by the reference position of the second sequential binary code to produce fifth products;
  means for sequentially multiplying each bit of a value from the first buffer, delayed by one PN chip duration, by the reference position of the first sequential binary code to produce sixth products;
  means for sequentially multiplying each bit of a value from the fourth buffer by the reference position of the second sequential binary code to produce seventh products;
  means for sequentially multiplying each bit of a value from the second buffer, delayed by one PN chip duration, buffer by the reference position of the first sequential binary code to produce eighth products;
  means for sequentially adding the inverse of bits of the fifth products to bits of the eighth products to produce third sums;
  means for sequentially adding bits of the sixth products to bits of the seventh products to produce fourth sums;
  means for adding in parallel bits comprising the third sums to a third integral;
  means for adding in parallel bits comprising the fourth sums to a fourth integral;
  means for repetitively advancing to next locations of the buffers and advancing the reference position to next positions of the sequential binary codes and repetitively employing the means from the first sequentially multiplying means through the second adding means until N sums have been added to each the third and fourth integrals;
  means for squaring the third integral to produce a third square;
  means for squaring the fourth integral to produce a fourth square; and
  means for summing the third and fourth squares to produce the second correlation value, and
means for restoring the reference position to one greater than its previous intial value and repeating the use of the means for determining an even correlation value and an odd correlation value for a total of N uses of those means,
whereby 2N correlation values are determined.

17. The apparatus of claim 15 wherein the radio communication system is a CDMA system, J is equal to 42, and K is equal to 15.

18. The apparatus of claim 16 wherein N is equal to at least the number of PN chips comprising the transmission delay.

19. In a radio communication system in which a transmitted signal comprises PN chips produced by spreading with PN code sequences, a method of determining a time delay of the system by demodulating a received signal comprising:
  sampling said transmitted signal at a rate greater than a PN chip rate to obtain signal sample values;
  storing a sequence of signal sample values;
  producing local replicas of the PN code sequences;
  correlating at a clock rate higher than the PN chip rate the stored sequence of signal sample values with a succession of said local replicas to obtain a succession of correlation values, and
  determining said time delay by determining a greatest correlation value.

20. The method recited in claim 19 wherein:
  the first local replica of said succession of local replicas comprises the PN code sequences applicable for a time delay equal to or less than a smallest expected time delay, and
  each successive local replica is delayed by one bit.

21. The method recited in claim 20 wherein:
  each local replica has a length in bits equal to the number of signal sample values in said stored sequence of signal sample values.

22. The method recited in claim 19 wherein:
  said sequence of signal sample values comprises sums of pairs of signal samples.

23. The method recited in claim 19, wherein:
  said sequence of signal sample values comprises sums of pairs of signal samples beginning with a first signal sample and sums of pairs of signal samples beginning with a second signal sample.

* * * * *